2,727,896
Patented Dec. 20, 1955

2,727,896
DERIVATIVES OF PYRROLE AND PROCESS

Harry Louis Yale and Jack Bernstein, New Brunswick, N. J., assignors to Olin Mathieson Chemical Corporation, New York, N. Y., a corporation of Virginia No Drawing. Application June 2, 1952,
Serial No. 291,321

14 Claims. (Cl. 260—295)

This invention relates to antimycobacterial, especially antituberculous, agents.

The development of agents for the treatment of tuberculosis has been receiving extensive consideration for some time. Thus far, the most widely used have been streptomycin and dihydrostreptomycin. However, their utility is limited, owing to their relatively-high toxicity, and patients must be watched carefully, especially where prolonged treatment is required. Auditory damage has been found to result from their use. Furthermore, they suffer from the disadvantage that for optimal results they must be administered by intermittent intramuscular injection, not perorally.

It is an object of this invention to provide relatively nontoxic antimycobacterial, especially antituberculous, agents (and methods of preparing them) for use in man and animals and environmentally. Availability of antituberculous agents for use in man is obviously of prime importance; availability of such agents for veterinary use is also of high value, tuberculosis in cattle and poultry, for example, being a significant problem.

The agents of this invention may also be used as environmental antimycobacterial agents, especially in hospitals and dairies. Thus, they may be dissolved in a suitable solvent and used as spray compositions, or dissolved in a compatible detergent solution and used for cleansing.

Another object of this invention is to provide relatively nontoxic antimycobacterial, especially antituberculous, agents, which are efficacious when administered perorally in suitable pharmaceutical formulation and which may also be formulated for parenteral use.

The antimycobacterial agents of this invention, which may also be used in the treatment of leprosy, comprise the following compounds and formulations thereof:

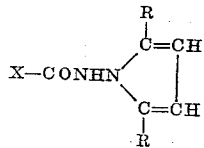

wherein X is the residue of a heterocyclic-carboxylic (especially a pyridinecarboxylic, thiophenecarboxylic or furoic acid stripped of its carboxyl group, and each R is hydrogen or alkyl (especially lower alkyl).

Following, in outline form, is the process by which the compounds of this invention may be prepared:

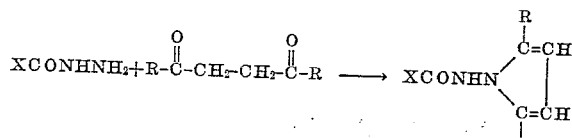

wherein X and R have the same meaning as hereinbefore given.

Thus, the hydrazones of this invention may be prepared by reacting a heterocyclic-carboxylic acid hydrazide with the appropriate γ-dioxo reactant. The hydrazide may be that of any heterocyclic acid, such as nicotinic, nipecotic, isonicotinic, isonipecotic, picolinic, 2-furoic, 3-furoic, 2-thiophenecarboxylic, 3-thiophenecarboxylic, 2-pyrrolecarboxylic, 2-pyrrolidinecarboxylic, 2-benzofurancarboxylic, 2 - thionaphthenecarboxylic, 2-thiazolecarboxylic, 4 - thiazolecarboxylic, 4-thiazolidinecarboxylic, 4-oxazolecarboxylic, 4-oxazolidinecarboxylic, 1,2-pyran-2-carboxylic and tetrahydrothiopyran-3-carboxylic; and substituted derivatives thereof, such as 5-amyl-2 - thiopenecarboxylic, 3-methyl-2-furoic, 2,5-dimethyl-tetrahydro-2-furoic, and 2-methyl-3-furoic. The hydrazides of these acids may be prepared by known methods [e. g. Meyer et al., Monatshefte, 33: 400 (1912)].

Representative γ-dioxo reactants include acetonylacetone, succinaldehyde (butanedial), s-dipropionylethane, β-propionyl-propionaldehyde, α-methyl-levulinaldehyde, ethylsuccindialdehyde, ω-dimethyl-levulinic acid methyl ketone, ω,ω-dimethyl-acetonyl-acetone, 3,6-octanedione, nonadecanon-4-al-1, methylsuccinaldehyde, etc.

Wide latitude is permissible with respect to reaction conditions. Thus, in preparing the compounds, the proportions of reactants used may be altered as desired; solvents, such as a lower alkanol, dioxane, dimethylformamide, the cellosolves (2-ethoxy-, 2-benzyloxy-, 2-butoxy- or 2-methoxy-etanol) and water may be used. Where expedient, an excess of the carbonyl reactant, such as acetonylacetone, may serve as solvent.

The acid-addition salt form of those compounds of this invention which contain a basic nitrogen atom may be obtained, using conventional methods. Thus, salts with mineral acids may be formed in aqueous solution or under anhydrous conditions, for example, by passing hydrogen chloride gas into an ethereal solution of the free base. Clearly, other salts, such as those of sulfuric acid, phosphoric acid, p-aminosalicylic acid, p-toluene-sulfonic acid, methionine, sulfamic acid, lactic acid, citric acid, gluconic acid, etc., may be prepared.

According to this invention, a therapeutically-active quantity of the hydrazone may be associated with a carrier which is preferably a solid material but which may also be a sterile pharmaceutical liquid vehicle or a carrier, such as a syrup. Thus, the formulations may take the form of tablets, powder packets, capsules, or other dosage-unit forms which are particularly useful for oral administration. These may be prepared in the conventional manner. For example, two-piece gelatin capsules may be made containing a mixture of the hydrazide and excipient (e. g., starch, talc, stearic acid, magnesium stearate), the hydrazide being present in an amount of the order of about 10 mg. or more. Also, one-piece gelatin capsules may be prepared containing the desired dosage (e. g. of the order of 10 to 100 mg. or more) in sufficient corn oil to render the compound capsulatable. Tablets may be prepared to contain of the order of 10 to 250 mg. or more of the hydrazide using starch, lactose or other conventional excipient and may be scored to enable one to take fractional dossages, if desired. Any of the tableting materials used in pharmaceutical practice may be employed where there is no incompatibility with the particular hydrazide.

The hydrazide may also be prepared in liquid (solution or suspension) form. Thus, a composition may be prepared to contain about 5 mg. or more of hydrazide per ml. of liquid pharmaceutical carrier, such as a carbohydrate-containing (e. g. syrup) or an aqueous-alcoholic vehicle. A sterile parenteral solution may be prepared, for example, by dissolving the hydrazide in water (e. g. about 100 mg./ml.), adding a preservative, such as chlorbutanol (5 mg./ml.) and then ampuling or packaging in multidose vials and sterilizing.

In all compositions where a carbohydrate such as lactose is used, sugar-alcohols, such as sorbitol or mannitol, may be substituted.

In addition to their use in man, the agents of this invention may be used with similar therapeutic effect for the treatment of tuberculosis in animals, such as poultry and cows. For such use, they may take the form of animal feed compositions, such as poultry feed compositions containing at least 0.1% of the agent and a significant amount of nutritive material.

Following are specific working examples merely illustrative of the manner in which the compounds of this invention may be prepared:

EXAMPLE 1

*1-(2-furoylamido)-2,5-dimethylpyrrole*

25 g. 2-furoic acid hydrazide and 100 ml. acetonylacetone are added to 100 ml. dimethylformamide and the mixture is refluxed gently for 30 minutes. About 200 ml. water is added to the reaction mixture, causing about 23 g. crude reaction product (M. P. 158–160° C.) to crystallize out. This product, when separated by filtration and recrystallized from 500 ml. 50% ethanol, yields the pure 1-(2-furoylamido)-2,5-dimethylpyrrole (M. P. 159–160° C.) having the formula

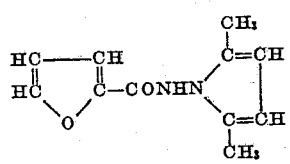

EXAMPLE 2

*1-(2-thiophenecarboxamido)-2,5-dimethylpyrrole*

A mixture of 25 g. 2-thiophenecarboxylic acid hydrazide and 100 ml. acetonylacetone is refluxed gently for one hour and the resulting mixture is decanted and diluted with 500 ml. water. The solid, which separates out, is isolated by filtration and, on recrystallization from 200 ml. 60% methanol, about 17.4 g. 1-(2-thiophenecarboxamido)-2,5-dimethylpyrrole (M. P. 197–199° C.) is obtained having the formula

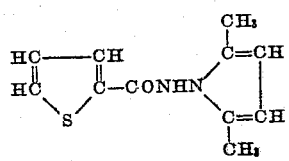

EXAMPLE 3

*1-(2-furoylamido)-pyrrole*

Using the procedure of Example 1 except that 100 ml. succinaldehyde is substituted for the acetonylacetone, 1-(2-furoylamido)-pyrrole is obtained, having the formula

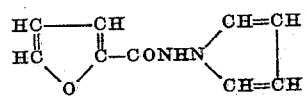

EXAMPLE 4

*1-(2-thiophenecarboxamido)-pyrrole*

Using the procedure of Example 2 except that 100 ml. succinaldehyde is substituted for the acetonylacetone, 1-(2-thiophenecarboxamido)-pyrrole is obtained, having the formula

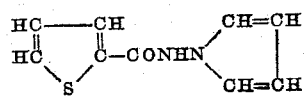

EXAMPLE 5

*1-(isonicotinoylamido)-2,5-dimethylpyrrole*

Using the procedure of Example 1 except that 28 g. isonicotinic acid hydrazide is substituted for the furoic acid hydrazide, 1-(isonicotinoylamido)-2,5-dimethylpyrrole is obtained, having the formula

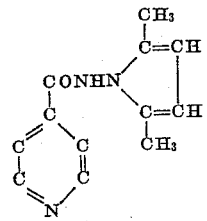

[Treatment of an ethereal solution of the free base with hydrogen chloride yields the hydrochloride salt.]

Clearly, by following the procedures given above and reacting other γ-dioxo compounds (i. e. s-dipropionylethane, ω-dimethyllevulinic methyl ketone, etc.) and/or other heterocyclic carboxylic hydrazides, the corresponding substituted pyrroles may be obtained. Thus, the invention may be variously otherwise embodied within the scope of the appended claims.

We claim:

1. Compounds selected from the group consisting of free bases of the formula

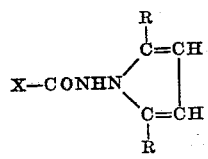

wherein X is a radical of the group consisting of 4-pyridyl, 2-thienyl, and 2-furyl, and each R is a member of the group consisting of hydrogen and lower alkyl; and non-toxic acid-addition salts thereof.

2. Compounds of the formula

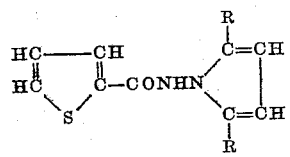

wherein each R is lower alkyl.

3. Compounds of the formula

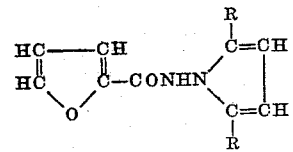

wherein each R is lower alkyl.

4. Compounds of the formula

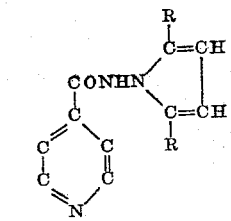

wherein each R is lower alkyl.

5. Non-toxic acid-addition salts of the compounds of claim 4.

6. The compound 1-(2-furoylamido)-2,5-dimethylpyrrole.

7. The compound 1-(2-thiophenecarboxamido)2,5-dimethylpyrrole.

8. The compound 1-(isonicotinoylamido)-2,5-dimethylpyrrole.

9. The hydrochloride of 1-(isonicotinoylamido)-2,5-dimethylpyrrole.

10. The p-aminosalicyclic acid salt of 1-(isonicotinoylamido)-2,5-dimethylpyrrole.

11. The process which comprises heating a heterocyclic-carboxylic acid hydrazide of the group consisting of isonicotinic acid hydrazide, 2-thiophenecarboxylic acid hydrazide and 2-furoic acid hydrazide with a γ-dioxo compound having the general formula

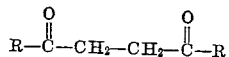

wherein each R is selected from the group consisting of hydrogen and lower alkyl, and isolating the resulting substituted pyrrole from the reaction mixture.

12. The process of claim 11 wherein the heterocyclic-carboxylic acid hydrazide is 2-furoic acid hydrazide.

13. The process of claim 11 wherein the heterocyclic-carboxylic acid hydrazide is 2-thiophenecarboxylic acid hydrazide.

14. The process of claim 11 wherein the heterocyclic-carboxylic acid hydrazide is isonicotinic acid hydrazide.

References Cited in the file of this patent
UNITED STATES PATENTS 2,596,069    Fox _____ May 6, 1952

OTHER REFERENCES

Gazz. Chim. Acta (Ital.), vol. 32, pp. 246–53 (1902).
Amer. Review of Tuberculosis, vol. 67, #3, pp. 354–65 (1953).
Jr. Org. Chem., vol. 18, pp. 983–1002 (1953).
Chem. Abst., vol. 46, cols. 8269–70 citing Compt. rend 234, pp. 1925–27 (1952), and Naturwissenschaften 39, p. 118 (1952).